April 16, 1957     F. L. DINSCH     2,788,543
APPARATUS FOR PRODUCING PLASTIC PIPE
Filed July 28, 1954     2 Sheets-Sheet 1

INVENTOR.
FRED L. DINSCH
BY Schmieding and Fultz
ATTORNEYS

INVENTOR.
FRED L. DINSCH
BY
Schmieding and Fultz
ATTORNEYS.

United States Patent Office 2,788,543
Patented Apr. 16, 1957

2,788,543

APPARATUS FOR PRODUCING PLASTIC PIPE

Fred L. Dinsch, Columbus, Ohio, assignor to The Plastex Company, a division of The Zimmerman Company, Columbus, Ohio, a corporation of Ohio Application July 28, 1954, Serial No. 446,197

15 Claims. (Cl. 18—14)

The present invention relates generally to the production of plastic products by extrusion and more particularly to novel apparatus for the continuous extrusion of multiple conduit plastic pipe.

It is, therefore, an object of the present invention to provide a die apparatus for the continuous extrusion of multiple conduit plastic pipe, which apparatus is adapted to receive flowing plastic material and to continuously form and extrude same into finished multiple conduit plastic pipe in the form of plastic pipes joined by integrally formed plastic web means.

It is another object of the present invention to provide apparatus of the type described which apparatus is adapted to progressively increase, along the flow path through the apparatus, the pressure to which the flowing plastic material is subjected. This feature serves to eliminate surging of the flowing plastic material and variations of pressure on the material at the discharge openings in the apparatus whereby uniformity in size, shape, and physical characteristics are achieved in the finished product.

It is another object of the present invention to provide apparatus of the type described which includes novel mandrel means around which the flowing plastic material is caused to pass, which mandrel means serves to effect a uniform transition, along the path of flow, from a solid column of flowing plastic material to the desired particular product shape for the present invention.

It is another object of the present invention to provide apparatus of the type described which includes novel mandrel means around which the flowing material is caused to pass for the purpose of forming the conduits in the extruded product, which mandrel means is provided with novel cooling means for cooling the flowing plastic material at the discharge portion of the apparatus.

It is still another object of the present invention to provide an apparatus of the type described which apparatus includes annular discharge openings, each of which is formed by mandrel means, and spaced surrounding wall means, and which apparatus further includes novel means for adjusting the mandrel means relative to the surrounding wall means whereby the apparatus can be adjusted to produce multiple conduits with uniform wall thickness for various operating conditions and material specifications which may be employed.

Other objects and advantages of the present invention will be apparent from the following description, reference being had to the accompanying drawings wherein a preferred form of embodiment of the invention is clearly shown.

Figure 1:
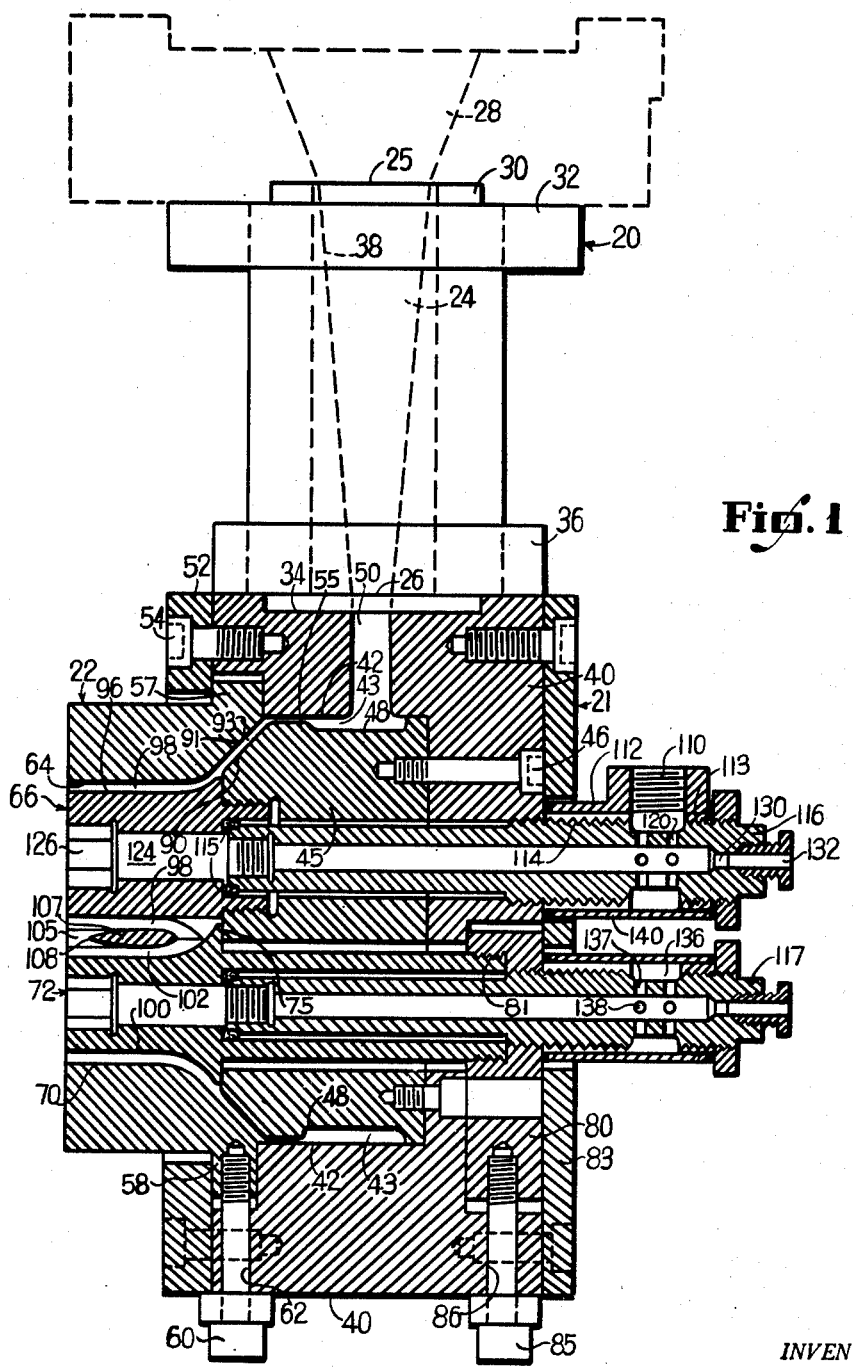
Figure 1 is a top view, partially in section, of the apparatus of the present invention, with the section being taken along the line 2—2 of Figure 2.

Referring to Figure 1 of the drawings, it will be seen that the present apparatus consists of a die body which includes an intake body portion, a central body portion, and a discharge body portion which are indicated generally at 20, 21 and 22 respectively.

The intake body portion 20 includes a converging passage 24, which is provided with an intake opening 25, and an exit opening 26. The intake opening 25 adjoins a passage 28 forming part of suitable conventional material feeding apparatus. Passage 28 is thereby adapted to continuously supply a flow of plastic material to the intake body portion 20. One end of the intake body portion 20 is provided with a protruding portion 30 adapted to register with the material feeding apparatus and with a mounting flange 32 which is bolted to the material feeding apparatus for securing the intake body portion 20 thereto.

The other end of the intake body portion 20 is provided with a protruding portion 34 and a flange 36 whereby such intake body portion is adapted to register with and is fastened to the central body portion 21.

With further reference to the intake body portion 20, it should be noted that the intake opening 25 is circular in cross-section, and the exit opening 26 is of oval cross-sectional shape. The wall 38 of the converging passage 24 is formed to provide a smooth converging transition wall from the round intake opening 25 to the oval exit opening 26.

Referring next to the central body portion 21, it will be seen that such portion includes a casing member 40 which forms an outer wall 42 of a passage 43. A mandrel portion 45 is secured to the casing member 40 by means of bolts 46, and an outer wall 48 of the mandrel portion 45 cooperates with the confronting wall 42 to form the passage 43. The casing member 40 is further provided with a passage 50, of oval cross-sectional shape, which passage 50 connects the passage 24 in the intake die portion with the passage 43 in the central die portion.

Referring next to the discharge body portion 22, it will be seen that such body portion is secured to the casing member 40 of the central body portion 21 by means of the plate 52 which is secured to the casing member 40 by means of the bolt 54 and which slideably engages the flanges 57 and 58 on the discharge body portion. Lateral adjustment of the discharge body portion 22, relative to the central body portion 21, is achieved by means of a threaded element 60 which extends freely through a hole 62 in the casing member and engages the discharge body portion 22 such that rotation of threaded element 60 will laterally pull the discharge body portion 22 relative to the central body portion 21. To laterally push the discharge body portion 22, relative to the central body portion 21, threaded elements 154 are carried in threaded holes in casing 40 and engage the outer wall of casing 40. When threaded elements 60 and 154 are drawn tight they work against each other to lock the body portions 21 and 22 against relative movement. Vertical adjustment of the discharge body portion 22, relative to the central body portion 21, is effected by threaded elements 62 and 157 which are carried in threaded holes through casing 40 and which engage the outer wall of discharge body portion 22.

Referring further to the discharge body portion 22, such body portion includes an inner circular wall 64 which surrounds a circular mandrel portion indicated generally at 66 and which is mounted to the mandrel portion 45.

The discharge body portion 22 further includes a second circular inner wall 70 which surrounds an adjustably mounted mandrel portion indicated generally at 72. The adjustably mounted mandrel portion 72 slidably engages the mandrel portion 45 at the surfaces 75 and 76. A sliding block 80 is joined to the adjustable mandrel portion 72 at the threads 81 and such block 80 is slidably retained by the casing member 40 and by inner surface of back plate member 83.

To adjustably move the adjustably mounted mandrel portion 72 relative to the other mandrel portion 66, a threaded element 85 passes freely through a hole 86 in the casing member 40 and engages the sliding block 80 whereby rotation of the threaded element 85 will laterally pull the sliding block 80, and the adjustably mounted mandrel portion 72 which is mounted thereon. A pair of threaded elements 156 serve to laterally push the mandrel portion 72. In addition, threaded elements 158 extend through the top and bottom of the casing 40, and engage sliding block 80 for vertically adjusting the mandrel portion 72.

In view of the above described adjusting apparatus, it is seen that the discharge body portion 22 can be vertically and horizontally adjusted relative to the central body portions 21 and relative to the mandrel portions mounted thereon. In addition, mandrel portion 72 is independently adjustable relative to the other mandrel portions whereby the distance between the longitudinal axes of such mandrel portions can be varied independently of adjustment of the discharge body portion.

Referring particularly to the junction between the mandrel portion 45 and the mandrel portions 66 and 72, it will be seen that the mandrel portion 45 is provided with a forwardly converging outer wall 90 in confronting relationship with an inner wall 91 on the discharge body portion 22 which confronting walls form a passage portion 93. Proceeding outwardly towards the discharge openings, it will be seen that the mandrel portion 66 is provided with an outer wall 96 in confronting relationship with the inner wall 64 to form a passage portion 98. In a similar manner, an outer wall 100 on the movable mandrel portion 72 is in confronting relationship with the inner wall 70 with such walls cooperating to form a passage portion 102.

At the outlet end of the passage 43, and at the entrance of the passage 93, the outer mandrel surface is provided with a protrusion 55 formed on wall surface 48 to provide a restriction in passage 43. The protrusion 55 completely surrounds the mandrel portion 45 in order to provide a restriction in the fluid passage of the junction between passages 43 and 93. Hence, plastic material flowing from passages 43 into passage 93 will undergo changes in pressure and flow velocity for reasons later to be described herein.

Figure 2:
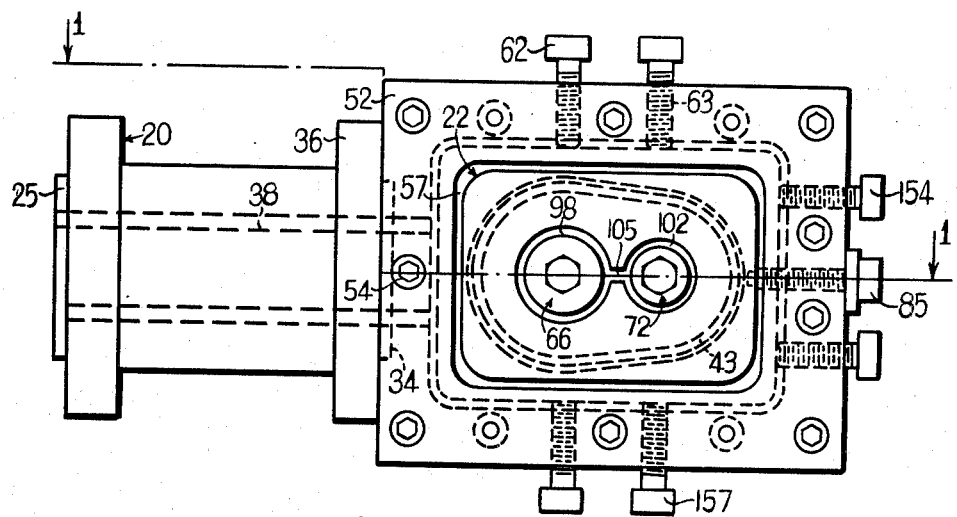
Figure 2 is a front view of the apparatus of the present invention.

Referring particularly to Figure 2, it will be seen that the exit passages 98 and 102 each communicate with an interconnecting exit passage 105 which serves to extrude a web of flowing plastic materials simultaneously with the extrusion of the plastic conduits with such web being integrally formed with the conduits so as to provide an interconnecting web between the conduits in the finished product.

With reference to Figure 1, a vertically extending member 107 of streamlined shape is disposed in the connecting passage 105 with such member 107 having a streamlined trailing edge 108 terminating inwardly of the exit opening whereby the flowing plastic material is caused to converge in the inter-connecting passage 105 to form the connecting web between the conduits being extruded prior to extrusion of the material through the discharge opening.

For the purpose of cooling the plastic material adjacent to the point of discharge from the apparatus, the mandrel portions 66, 72 and 45 are provided with novel cooling means which includes two fluid passages through each of the mandrel portions 66 and 72. One of the fluid passages in each of the mandrels serves to convey and discharge cooling fluid into the product being formed and the other fluid passage serves to allow excess fluid to flow backwardly through and out of the apparatus to prevent the excessive build-up of fluid pressure within the product being formed.

Referring particularly to the anvil portion 66 for the purpose of describing the cooling means, a fluid intake opening 110 is connected with a source, not illustrated, of cooling fluid such as air. A housing 112 surrounds and is supported by the rear ends of a pair of two-way duct members 116 and 117 at the threaded junction 113 and the forward end of the housing 112 is maintained in sealed engagement with the rear surface of casing 40 by suitable gasket means provided between the forward end of the housing 112 and the confronting rear casing surface.

The two-way duct 116 is supported by the casing 40 at the threads 114 and such duct extends forwardly into sealed contact with mandrel portions 66 at the seal 115.

The two-way duct member 116 is formed of a tube within a tube to provide both a fluid intake duct and a fluid return duct. The outer tube of the two-way duct member 116 communicates with the intake hole 110 by means of holes 120, and the fluid is carried forwardly through the outer tube into a chamber 124 and then outwardly through the opening 126 and into the conduit of plastic material being extruded around the mandrel portion 66. It should be noted that the opening 126 is of hexagonal cross-section to adapt the opening for receiving wrench means whereby the mandrel portion 66 can be rotated to detach same from the mandrel portion 45.

The two-way duct member 116 also includes a central tube 130 which communicates with a passage 132 which leads to suitable valve means for controlling the rate of return air discharged through the tube 130.

With further reference to Figure 1, it will be noted that fluid entering the intake opening 110 is also supplied to a second two-way duct member 117 by means of an annular passage 136 which, in turn, communicates with the intake holes 137. This two-way duct member 117 is supported by the sliding block 80 and the forward end thereof is maintained in sealed relationship with the mandrel portion 72. A sealed inner wall means 140 is provided within the housing 112 to form the air passage 136 with such wall means 140 being in slidable sealing engagement with the back wall of the casing member 40 and the back wall of sliding block 80 which supports the movable mandrel portion 72. Hence it is seen that a sliding seal is maintained when the adjustable mandrel portion 72 is moved relative to the fixed mandrel portion 66 in varying the distance between such mandrel portions.

In operation, flowing plastic material is continuously supplied to the converging passage 24 at the intake opening 25 by means of suitable feed mechanism not illustrated. Such feed mechanism generally consists of suitable plastic translating means such as an auger journalled in a tube whereby rotation of the auger continuously advances the plastic material to the extrusion die apparatus. It is an inherent characteristic of such feed mechanisms to produce surges in the plastic material being transported with the result that such surges produce undesirable variations in the rate of flow of the plastic material. These variations in flow rate, due to surging of the material in the feed mechanism, will ordinarily produce surging in the die apparatus which has the undesirable effect of varying the physical characteristics of the plastic material along the length of the pipe being extruded.

According to the present invention, the above described surging effect is prevented from effecting the flow of the plastic material at the discharge passages 98 and 102 in the die apparatus by the provision of restriction means in the flow path intermediate the intake opening 25 in the intake body portion 20 and the outlet passages 98 and 102 in the discharge body portion 22. With reference to Figure 1, it will be noted that the passage 24 is convergent in the direction of flow and the outer wall 48 on the mandrel is provided with a protrusion 55 to provide a constricted passage between the passages 43 and 93. This construction serves to substantially eliminate variations in the flow of plastic material in the discharge passages 98 and 102. This advantage is believed to result from pressure increases along the path of material flow, which form a pressure lock that prevents the effect of surging of the material, in the feed mechanism, from being transmitted through the flowing material to the discharge passages 98 and 102. Hence substantially uniform flow rates are achieved at the zone of product formation producing a homogeneous product notwithstanding surging fluctuations in flow rate of the material flowing through the feed mechanism.

With reference to Figures 1 and 2, it is seen that the flowing plastic material, leaving the passage 50, is caused to divide and flow around the outer wall 48 of mandrel portion 45. Once the passage 43 is filled with flowing material at the outset of operation, a forward flow of material will be produced first through the restrictions at protrusion 55, next forwardly through the converging passage 93, and then outwardly through the discharge passages 98 and 102. It will be understood that passage 43 serves to accumulate and distribute flowing plastic material to the two discharge passages 98 and 102.

Since annular passages 98 and 102 may be of different diameters, it is necessary to supply the proper volume of flowing plastic material to each discharge passage so that the flow rate, but not the flow volume, will be substantially equal through each of the discharge passages 98 and 102. To achieve this result the cross-sectional area of the portion of the passage 43, which supplies material to the smaller discharge passage 102, is less than the cross sectional area of the portion of passage 43 which supplies material to the greater discharger passage 98. This is best illustrated in Figure 2 where the cross section of passage 43 is seen to consist of a large arcuate portion and a small arcuate portion connected by two straight portions. Hence it is seen that passage 43 serves as a collector or accumulator which serves to transform the solid column of flowing material, in passages 24 and 50, into a hollow column of flowing material in the passages 43 and 93. Moreover, passage 43 serves to supply the appropriate volume of flowing material to each of the different sized discharge passages 98 and 102.

Figure 3:
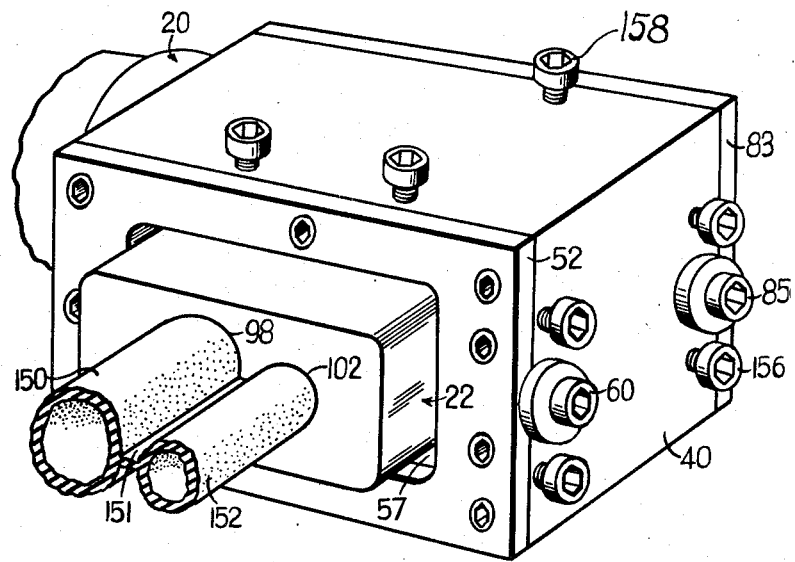
Figure 3 is a front perspective view of the apparatus of the present invention and showing the product produced from the present apparatus being extruded therefrom.

As the flowing material leaves the converging passage 93, which surrounds the mandrel portion 45, it is necessary to change the flowing mass of material, with a single hollow portion, to a flowing mass of material with two hollow portions in order to produce the two hollow conduits 150 and 152 illustrated in Figure 3. Moreover, the required interconnecting web 151 must be integrally formed with the two hollow conduits.

At this point, it should be mentioned that double pipe, illustrated in Figure 3, is formed with conduits of different diameters. Such double plastic pipe is particularly useful in connection with submerged pumps in water well installations wherein two non-corrosive conduits are required.

As the flowing plastic material proceeds along the converging passage 93 it is caused to proceed from an upper passage portion, of cross sectional shape seen at 43 in Figure 2, to a passage portion of double conical configuration, and then into two annular passage portions connecting with annular discharge passages 98 and 102. It is also necessary to form the interconnecting web 151 between the two conduit portions of the pipe. For this purpose a member 107, of streamlined cross sectional shape, is disposed intermediate the two discharge passages 98 and 102. Upper and lower flat walls 105 are located at the trailing edge 108 of the streamlined member 107, with such flat walls 105 providing a discharge passage, interconnecting the conduit-forming passages 98 and 102, which serves to form the web 151 simultaneously with the formation of the conduit portion of the product.

In summary, it is seen that the present invention provides novel apparatus for continuously producing double conduit plastic pipes. Such apparatus is adapted to produce non-fluctuating flows at the discharge portion of the apparatus notwithstanding flow rate fluctuations which may occur in the feed mechanism, which continuously supply flowing plastic material to the apparatus. In addition, the apparatus is adapted to continuously form multiple conduit plastic pipe, with such conduits being of different diameter and joined by integrally formed web means. As a further advantage, novel cooling means is provided in the apparatus whereby the flowing plastic material can be effectively cooled at the portion of the apparatus where the product is being formed.

While the form of embodiment of the present invention as herein disclosed constitutes a preferred form, it is to be understood that other forms might be adopted, all coming within the scope of the claims which follow.

I claim:

1. A die for the continuous extrusion of multiple conduit plastic pipe having a plurality of conduit-forming wall means integrally formed and joined one to another, said die, comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel disposed in one of said discharge passages, the outer wall of said mandrel being spaced from the inner wall of said one discharge passage to form an annular passage; and a second mandrel disposed in the other of said discharge passages, the outer wall of said second mandrel being spaced from the inner wall of the other of said discharge passages to form a second annular passage of smaller size than said first annular passage, said second annular passage being connected to said first annular passage at the outlet portions thereof to form material into two conduit-forming wall means integrally formed and joined one to another; and a third mandrel disposed in said connecting passage means of said central body portion, said third mandrel and the confronting wall of said connecting passage means forming a first passage side of arcuate cross-section communicating with said first annular passage and a second passage side of arcuate cross-section communicating with said second annular passage, the radius of the arc of said second passage side being less than the radius of the arc of said first passage side.

2. A die for the continuous extrusion of multiple conduit plastic pipe having a plurality of conduit-forming wall means integrally formed and joined one to another, said die comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel portion disposed in one of said discharge passages, the outer wall of said mandrel portion being spaced from the inner wall of said one discharge passage to form an annular passage; a second mandrel portion disposed in the other of said discharge passages, the outer wall of said mandrel portion being spaced from the inner wall of the other of said discharge passages to form a second annular passage, said second annular passage being connected to said first annular passage at the outlet portions thereof to form material into two conduit-forming wall means integrally formed and joined one to another; and a third mandrel portion disposed in said connecting passage means, the outer wall of said third mandrel portion being spaced from the inner wall of said connecting passage means to form a third annular passage communicating with said first and second annular passages, certain of said spaced outer and inner walls being provided with a groove for receiving said flowing plastic material from said intake passage for distributing said material about said third mandrel portion.

3. A die for the continuous extrusion of multiple conduit plastic pipe having a plurality of conduit-forming wall means integrally formed and joined one to another, said die comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel portion disposed in one of said discharge passages, the outer wall of said mandrel portion being spaced from the inner wall of said one discharge passage to form an annular passage; a second mandrel portion disposed in the other of said discharge passages, the outer wall of said second mandrel portion being spaced from the inner wall of the other of said discharge passages to form a second annular passage, said second annular passage being connected to said first annular passage at the outlet portions thereof to form material into two conduit-forming wall means integrally formed and joined one to another; and a third mandrel portion disposed in said connecting passage means, the outer wall of said third mandrel portion being spaced from the inner wall of said connecting passage means to form a third annular passage communicating with said first and second annular passages, with the inner end of each of said first and second mandrel portions forming a junction with an end of said third mandrel portion, the outer wall of said junction being convergent from the third mandrel portion towards the first and second mandrel portions, and said third annular passage being provided with a peripherally extending groove located upstream of a restricted passage portion.

4. A die for the continuous extrusion of multiple conduit plastic pipe having a plurality of conduit-forming wall means integrally formed and joined one to another, said die comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel portion disposed in one of said discharge passages, the outer wall of said mandrel portion being spaced from the inner wall of said one discharge passage to form an annular passage; a second mandrel portion disposed in the other of said discharge passages, the outer wall of said second mandrel portion being spaced from the inner wall of the other of said discharge passages to form a second annular passage, said second annular passage being connected to said first annular passage at the outlet portions thereof to form material into two conduit-forming wall means integrally formed and joined one to another; and a third mandrel portion disposed in said connecting passage means, the outer wall of said third mandrel portion being spaced from the inner wall of said connecting passage means to form a third annular passage communicating with said first and second annular passages, with the inner end of each of said first and second mandrel portions forming a junction with an end of said third mandrel portion whereby said third annular passage communicates with each of said first and second annular passages; and means forming a peripherally extending groove in a wall of said third annular passage, said groove being upstream of an annular restricted portion along said passages.

5. A die for the continuous extrusion of multiple conduit plastic pipe comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel portion disposed in one of said discharge passages; the outer wall of said mandrel portion being spaced from the inner wall of said one discharge passage to form an annular passage; a second mandrel portion disposed in the other of said discharge passages, the outer wall of said second mandrel portion being spaced from the inner wall of the other of said discharge passages to form a second annular passage of smaller size than said first annular passage; and a third mandrel portion disposed in said connecting passage means and provided with an outer surface portion convergent towards said first and second mandrel portions, the outer wall of said third mandrel portion being spaced from the inner wall of said connecting passage means to form a third annular passage converging towards and communicating with said first and second annular passages, said third annular passage including a first side portion of arcuate cross-sectional shape communicating with said first annular passage and a second side portion of arcuate cross-sectional shape communicating with said second annular passage, the radius of the arc of said second side portion being less than the radius of the arc of said first side portion, with the inner end of each of said first and second mandrel portions forming a junction with an end of said third mandrel portion whereby said third annular passage communicates with each of said first and second annular passages; and means forming an annular restricted portion at said junction.

6. A die for the continuous extrusion of multiple conduit plastic pipe comprising, in combination, an intake body portion forming an intake passage for receiving flowing plastic material; a discharge body portion forming two adjacent parallelly extending discharge passages of different size for simultaneously discharging said plastic material; a central body portion forming connecting passage means for said plastic material between said intake body portion and said discharge body portion; a mandrel portion disposed in one of said discharge passages, the outer wall of said mandrel portion being spaced from the inner wall of said one discharge passage to form an annular passage; a second mandrel portion disposed in the other of said discharge passages, the outer wall of said second mandrel being spaced from the inner wall of the other of said discharge passages to form a second annular passage of smaller size than said first annular passage; and a third mandrel portion disposed in said connecting passage means; the outer wall of said third mandrel portion being spaced from the inner wall of said connecting passage means to form a third annular passage communicating with said first and second annular passages, said third annular passage including a first side portion of arcuate cross-sectional shape communicating with said first annular passage and a second side portion of arcuate cross-sectional shape communicating with said second annular passage, the radius of the arc of said second side portion being less than the radius of the arc of said first side portion, with the inner end of each of said first and second mandrel portions forming a junction with an end of said third mandrel portion, the outer wall of said junction being convergent from the third mandrel portion towards the first and second mandrel portions.

7. A die for the continuous extrusion of multiple conduit plastic pipe having a plurality of conduit-forming wall means integrally formed and joined one to another, said die comprising, in combination, an intake body portion forming an intake passage for receiving flowing plastic material; a discharge body portion forming two adjacent parallelly extending discharge passages of different size for simultaneously discharging said plastic material; a central body portion forming connecting passage means for said plastic material between said intake body portion and said discharge body portion; a mandrel disposed in one of said discharge passages, the outer wall of said mandrel being spaced from the inner wall of said one discharge passage to form an annular passage; a second mandrel disposed in the other of said discharge passages, the outer wall of said second mandrel being spaced from the inner wall of the other of said discharge passages to form a second annular passage of smaller size than said first annular passage, said second annular passage being connected to said first annular passage at the outlet portions thereof to form material into two conduit-forming wall means integrally formed and joined one to another; and said intake passage including an exit port, communicating with said connecting passage means, and an intake port, said exit port being of restricted cross sectional area relative to said intake port; and a third mandrel disposed in said connecting passage means of said central body portion said third mandrel and the confronting wall of said connecting passage means forming a first passage side of arcuate cross-section communicating with said first annular passage and a second passage side of arcuate cross-section communicating with said second annular passage, the radius of the arc of said second passage side being less than the radius of the arc of said first passage side.

8. A die for the continuous extrusion of multiple conduit plastic pipe comprising, in combination, an intake body portion forming an intake passage for receiving flowing plastic material; a discharge body portion forming two adjacent parallelly extending discharge passages of different size for simultaneously discharging said plastic material; a central body portion forming connecting passage means for said plastic material between said intake body portion and said discharge body portion; a mandrel portion disposed in one of said discharge passages, the outer wall of said mandrel portion being spaced from the inner wall of said one discharge passage to form an annular passage; and a second mandrel portion disposed in the other of said discharge passages, the outer wall of said second mandrel being spaced from the inner wall of the other of said discharge passages to form a second annular passage smaller than said first annular passage; and a third mandrel portion disposed in said connecting passage means, the outer wall of said third mandrel portion being spaced from the inner wall of said connecting passage means to form a third annular passage having a first passage portion communicating with said first annular passage and a second passage portion, of smaller cross-sectional area than said first passage portion, communicating with said second smaller annular passage, and the longitudinal axis of said mandrel portions being disposed substantially perpendicular to the longitudinal axis of siad intake passage, and said intake passage including an intake port and an exit port, said exit port confronting said outer wall of said third mandrel portion for discharging plastic material against said outer wall and circumferentially around said third annular passage, and said third mandrel portion including a peripherally extending groove formed in the outer wall thereof for receiving said plastic material from said exit port.

9. A die for the continuous extrusion of multiple conduit plastic pipe having a plurality of conduit-forming wall means integrally formed and joined one to another, said die comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel portion disposed in one of said discharge passages, the outer wall of said mandrel being spaced from the inner wall of said one discharge passage to form an annular passage; a second mandrel portion disposed in the other of said discharge passages, the outer wall of said second mandrel portion being spaced from the inner wall of the other of said discharge passages to form a second annular passage of smaller size than said first annular passage, said second annular passage being connected to said first annular passage at the outlet portions thereof to form material into two conduit-forming wall means integrally formed and joined one to another; and a third mandrel portion disposed in said connecting passage means, the outer wall of said third mandrel portion being spaced from the inner wall of said connecting passage means to form a third annular passage communicating with said first and second annular passages, said third annular passage including a first side portion of arcuate cross-sectional shape communicating with said first annular passage and a second side portion of arcuate cross-sectional shape communicating with said second annular passage, the radius of the arc of said second side portion being less than the radius of the arc of said first side portion; and means for moving said discharge body portions relative to said mandrel portions for selectively varying the space between the inner walls of said discharge passages and the confronting outer walls of said mandrels.

10. A die for the continuous extrusion of multiple conduit plastic pipe having a plurality of conduit-forming wall means integrally formed and joined one to another, said die comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel disposed in one of said discharge passages, the outer wall of said mandrel being spaced from the inner wall of said one discharge passage to form an annular passage; and a second mandrel disposed in the other of said discharge passages, the outer wall of said second mandrel being spaced from the inner wall of the other of said discharge passages to form a second annular passage of smaller size than said first annular passage, said second annular passage being connected to said first annular passage at the outlet portions thereof to form material into two conduit-forming wall means integrally formed and joined one to another; and each of said first and second mandrels including duct means extending longitudinally through the mandrel for discharging fluid from the ends of said mandrel at the exit of the discharge passage associated with said mandrel; and a third mandrel disposed in said connecting passage means of said central body portion, said third mandrel and the confronting wall of said connecting passage means forming a first passage side of arcuate cross-section communicating with said first annular passage and a second passage side of arcuate cross-section communicating with said second annular passage, the radius of the arc of said second passage side-being less than the radius of the arc of said first passage side.

11. A die for the continuous extrusion of multiple conduit plastic pipe having a plurality of conduit-forming wall means integrally formed and joined one to another, said die comprising, in combination, an intake body portion forming an intake passage for receiving flowing plastic material; a discharge body portion forming two adjacent parallelly extending discharge passages for simultaneously discharging said plastic material; a central body portion forming connecting passage means for said plastic material between said intake body portion and said discharge body portion; a mandrel disposed in one of said discharge passages, the outer wall of said mandrel being spaced from the inner wall of said one discharge passage to form an annular passage; a second mandrel disposed in the other of said discharge passages, the outer wall of said second mandrel being spaced from the inner wall of the other of said discharge passages to form a second annular passage of smaller size than said first annular passage, said second annular passage being connected to said first annular passage at the outlet portions thereof to form material into two conduit-forming wall means integrally formed and joined one to another; means for moving one of said mandrel portions relative to the other of said mandrel portions for selectively adjusting the distance between and relative heights of said two mandrel portions; and a third mandrel disposed in said connecting passage means of said central body portion, said third mandrel and the confronting wall of said connecting passage means forming a first passage side of arcuate cross-section communicating with said first annular passage and a second passage side of arcuate cross-section communicating with said second annular passage, the radius of the arc of said second passage side being less than the radius of the arc of said first passage side.

12. A die for the continuous extrusion of multiple conduit plastic pipe having a plurality of conduit-forming wall means integrally formed and joined one to another, said die comprising, in combination, a body forming a passage with an inner wall surface; a member disposed in said passage, the outer surface of said member being spaced from said inner wall surface to form said passage, certain of said spaced outer and inner walls being provided with a groove for receiving said flowing plastic material from said intake passage for distributing said material about said third mandrel portion; two parallelly extending discharge passages of different cross sectional areas and connected with said first mentioned passage, said two discharge passages being connected one to the other at the outlet portions thereof to form material into two conduit-forming wall means integrally formed and joined one to the other; the longitudinal axes of said discharge passages being substantially parallel with the axis of flow of said first mentioned passage; and with the cross-sectional area of a portion of said first mentioned passage which supplies flowing plastic material to one of said discharge passages being greater than the cross sectional area of the remaining portion of said first mentioned passage whereby different volumetric flow rates are established in said two passages to provide substantially equal material flow velocities in said two passages.

13. A die for the continuous extrusion of multiple conduit plastic pipe having a plurality of conduit-forming wall means integrally formed and joined one to another, said die comprising, in combination, a body forming a cavity with an inner wall surface; a member disposed in said cavity, the outer surface of said member being spaced from said inner wall surface to form a passage, certain of said spaced outer and inner walls being provided with a groove for receiving said flowing plastic material from said intake passage for distributing said material about said third mandrel portion; two substantially parallelly extending discharge passages connected with said first mentioned passage; a mandrel disposed in one of said discharge passages and provided with an outer surface spaced from the inner surface of said one discharge passage; a second mandrel disposed in the other of said discharge passages and provided with an outer surface spaced from the inner surface of said other discharge passage, said two discharge passages being connected one to the other at the outlet portions thereof to form material into two conduit-forming wall means integrally formed and joined one to the other; and certain of said surfaces forming converging passage means between said first mentioned passage and said discharge passages, said converging passage means including two intersecting conical passage portions whereby the flowing plastic material is efficiently conducted from said first mentioned passage to said two discharge passages.

14. A die for the continuous extrusion of multiple conduit plastic pipe having a plurality of conduit-forming wall means integrally formed and joined one to another, said die comprising, in combination, a body including a plurality of substantially parallel discharge passages; a mandrel disposed in each of said discharge passages; passage means extending between one of said discharge passages and an adjacent discharge passage at the exit port of said passages whereby flowing plastic material is discharged from said connecting passage means simultaneously with the discharge of flowing plastic material from said discharge passages; and a member disposed within said passage means adjacent to the discharge end thereof, said member being provided with two curved side walls each of which is spaced from a confronting outer surface of one of said mandrels a distance substantially equal to the wall thickness of the conduit to be produced at the mandrel confronting said side wall.

15. A die for the continuous extrusion of multiple conduit plastic pipe having a plurality of conduit-forming wall means integrally formed and joined one to another, said die comprising, in combination, a body including a plurality of substantially parallel discharge passages; a mandrel disposed in each of said discharge passages; passage means extending between one of said discharge passages and an adjacent discharge passage at the exit port of said passages whereby flowing plastic material is discharged from said connecting passage means simultaneously with the discharge of flowing plastic material from said discharge passages; and a member disposed in said passage means in the path of material flowing therethrough for continuously shaping confronting sidewall portions of adjacent conduits being formed, said member being provided with a streamlined trailing edge portion spaced upstream from but adjacent to the exit opening of said passage means whereby plastic material flowing past said member is caused to converge to continuously and integrally form a connecting web between adjacent plastic conduits being formed by said adjacent discharge passages.

References Cited in the file of this patent
UNITED STATES PATENTS

| | | |
|---|---|---|
| 539,489 | Schmall | May 21, 1895 |
| 1,228,495 | Tanzi | June 5, 1917 |
| 1,744,130 | McChesney et al. | Jan. 21, 1930 |
| 1,814,820 | Boswell | July 14, 1931 |
| 2,216,832 | Royle | Oct. 8, 1940 |
| 2,331,195 | Jannsen | Oct. 5, 1943 |
| 2,624,073 | Pugh | Jan. 6, 1953 |
| 2,626,427 | Brown | Jan. 27, 1953 |
| 2,683,897 | Patterson | July 20, 1954 |